United States Patent [19]

Osaka et al.

[11] Patent Number: 5,275,759
[45] Date of Patent: Jan. 4, 1994

[54] ZIRCONIA SOL, METHOD FOR PRODUCTION THEREOF, POROUS CERAMIC-PRODUCING SLURRY, AND POROUS CERAMIC PRODUCT OBTAINED BY USE THEREOF

[75] Inventors: Shigemi Osaka; Kazuo Hata; Tsukawa Takahashi; Teruyuki Moto, all of Himeji, Japan

[73] Assignee: Nippon Shokubai Kagaku Kogyo Co., Ltd., Osaka, Japan

[21] Appl. No.: 975,961

[22] Filed: Nov. 13, 1992

Related U.S. Application Data

[63] Continuation of Ser. No. 582,838, filed as PCT/JP90/00162, Feb. 9, 1990, abandoned.

[30] Foreign Application Priority Data

| Feb. 10, 1989 | [JP] | Japan | 1-29672 |
| May 19, 1989 | [JP] | Japan | 1-124128 |
| Jul. 14, 1989 | [JP] | Japan | 1-180182 |
| Aug. 15, 1989 | [JP] | Japan | 1-209598 |
| Feb. 9, 1990 | [JP] | Japan | PCT/JP90/00162 |

[51] Int. Cl.$^5$ ............................................. B01J 13/00
[52] U.S. Cl. ................................. 252/313.1; 501/103
[58] Field of Search .................. 501/103; 252/315.2, 252/313.1; 106/38.22; 423/71, 72

[56] References Cited

U.S. PATENT DOCUMENTS

| 3,157,601 | 11/1964 | Fitch | 252/301.1 |
| 4,863,706 | 9/1989 | Wada et al. | 423/277 |
| 4,927,560 | 5/1990 | Osaka et al. | 252/315.1 |
| 5,004,039 | 4/1991 | Feagin | 164/361 |
| 5,004,711 | 4/1991 | Grodek | 501/103 |

FOREIGN PATENT DOCUMENTS

| 253552 | 1/1988 | European Pat. Off. . |
| 280673 | 8/1988 | European Pat. Off. . |
| 60-018250 | 7/1983 | Japan . |
| 62-156946 | 7/1987 | Japan . |
| 62-275025 | 11/1987 | Japan . |
| 63-2809 | 1/1988 | Japan . |
| 63-222014 | 9/1988 | Japan . |
| 1171196 | 11/1969 | United Kingdom . |
| 1234575 | 6/1971 | United Kingdom . |

*Primary Examiner*—Karl Group
*Assistant Examiner*—A. Wright
*Attorney, Agent, or Firm*—Burns, Doane, Swecker & Mathis

[57] ABSTRACT

A highly concentrated zirconia sol is produced by a method which comprises heating an aqueous solution of a zirconium salt in the presence of urea thereby obtaining a transparent zirconia sol, concentrating the zirconium sol with an ultrafilter membrane, and subjecting the concentrated zirconic sol to thermal concentration at a temperature of not higher than 80° C. The sol thus obtained enjoys lasting stability. Optionally, this sol may incorporate therein a chelating agent and a compound of a metal other than zirconium. A slurry of the zirconia sol incorporating therein minute refractory particles is useful for the manufacture of a porous ceramic article. A ceramic product obtained by firing this slurry is advantageously used in a mold for casting.

10 Claims, No Drawings

ZIRCONIA SOL, METHOD FOR PRODUCTION THEREOF, POROUS CERAMIC-PRODUCING SLURRY, AND POROUS CERAMIC PRODUCT OBTAINED BY USE THEREOF

This application is a continuation of application Ser. No. 07/582,838, filed as PCT/JP90/00162, Feb. 9, 1990 now abandoned.

BACKGROUND OF THE INVENTION

1. Technical Field

This invention relates to a zirconia sol, a method for the production thereof, a porous ceramic-producing slurry, and a porous ceramic product obtained by the use of the slurry. More particularly, it relates to a transparent zirconia sol useful as a coating agent for imparting various properties such as resistance to heat and resistance to abrasion to a substrate, as an inorganic binder capable of manifesting high adhesive strength, or as a material for the manufacture of a zirconia type fine composite powder and zirconia type fibers and a method for the production of the zirconia sol. It further relates to a porous ceramic-producing slurry containing the zirconia sol as an essential component thereof and a porous ceramic product obtained by the use of the slurry and, more specifically, a mold of a porous ceramic material useful for precision casting of such highly active metals as titanium alloys.

2. Background Art

In the methods heretofore used for the production of a zirconia sol from an aqueous solution of a zirconium salt, a method which comprises causing the aqueous solution of a zirconium salt to react with a basic substance thereby inducing formation of a precipitate and deflocculating the precipitate with an acid and a method which comprises pouring into the aqueous solution of a zirconium salt a basic substance of a pH value such as to avoid the occurrence of a precipitate thereby giving rise to a sol have been renowned. Besides, a method which produces a zirconia colloidal sol by heating the aqueous solution of a zirconium salt under normal pressure or under increased pressure thereby causing hydrolysis of the aqueous solution has been known to the art. The sol which is obtained by any of these methods is subsequently purged of ions.

The zirconia sol obtained as described above is used as a coating agent which is applied in the form of a coating to the surface of a substrate of a metallic substance, glass, or plastic substance for the purpose of imparting to the substrate such properties as resistance to heat, resistance to abrasion, resistance to chemicals, insulation, reflection proof, absorption of ultraviolet light, and rigidity at raised levels. It is used, in the field of inorganic binders, as a molding binder serving the purpose of impregnating porous refractory materials and as a casting binder for metallic titanium type cast products. It is further used as a raw material for piezoelectric materials, electroconductive paste, electronic parts such as a humidity sensor and a temperature sensor, catalysts, and other composite materials.

The zirconia sols which are produced by the conventional methods described above, however, have unduly low concentrations and suffer from inferior transparency due to excessively large diameters of sol particles. When they are used as a coating agent or an inorganic binder, therefore, the properties they manifest to a certain extent at all are not fully satisfactory in the field requiring a coating agent to form a film of large thickness and a binder to exhibit high adhesive strength.

Where a zirconia sol is used as a coating agent or a binder particularly at a high temperature, it is preferable to incorporate therein such an element as calcium, magnesium, or yttrium to serve as a stabilizer for preventing variation of the volume thereof due to transformation of the phase of zirconia. The zirconia sol which incorporates therein such an element as mentioned above, however, has the disadvantage that it is deficient in stability to withstand the influence of aging as evinced by the susceptibility to gelling and flocculation. For the prevention of a rise in viscosity, the idea of adjusting the pH value of the sol may be conceived as a countermeasure. The effect of this measure, however, is not sufficient.

A porous mold to be used for precision casting is generally manufactured by fabricating a casting model (the term "casting model" will be used hereinafter in the present invention) in a desired shape with wax, naphthalene, a low melting alloy, urea, or foamed styrene which is removable by heat, with water, or with an industrial chemical such as solvent, i.e. a thermally or chemically removable material, alternately applying to the casting model a slurry produced by mixing a fine refractory powder with a caking agent (hereinafter referred to occasionally as a "molding agent") and refractory particles identical or not identical with the fine refractory powder mentioned above, drying the coated casting model thereby forming a mold (the term "green mold" will be used hereinafter in the present invention), then removing the inner casting model by a thermal or chemical treatment, and sintering the residual green mold.

To be used as the casting agent in the form of slurry, various ceramic type casting agents including those of the silica type, the magnesia type, the zirconia type, and the calcia type have been developed. When a metal of high activity such as titanium or a titanium alloy is to be cast, however, a cast product of highly desirable quality cannot be obtained because of a serious metal-mold reaction if the mold to be used is formed of a silica type casting agent which is generally used extensively in casting a high melting metal. The feasibility of a casting agent of the magnesia type, the zirconia type, or the calcia type which is inconspicuously reactive with such a highly active metal and is effective in curbing oxidation has been being studied. This casting agent is not satisfactory in terms of strength and thermal shock resistance of the mold and in terms of strength and thermal shrinkage of the green mold and is in need of various improvements.

As a caking agent for the manufacture of a mold to be used in precision casting of titanium or a titanium alloy, it has been known to the art that zirconium salts such as zirconium acetate and zirconium nitrate and zirconium alkoxides such as zirconium butoxide are available besides zirconia sol. As is clearly noted from the method for the manufacture of a porous ceramic mold to be used for precision casting, the caking agent fulfills a significant role in the imparting of strength to the green mold and the mold. The zirconia type caking agent heretofore known to the art has been incapable of bringing about any fully satisfactory result. For the purpose of improving dispersibility, flowability, and stability of the materials for the mold and enhancing strength of the green mold and the mold, the feasibility of using the caking agent in combination with a varying organic binder and a varying surfactant has been studied. The combined use brings about an improvement appreciable to a certain degree but not fully satisfactory. A desire has been expressed in the industry to develop a caking agent of highly satisfactory quality, particularly zirconia sol.

An object of this invention, therefore, is to provide a transparent zirconia sol, particularly a transparent high-quality zirconia sol of a high concentration, and a method for the production thereof.

Another object of this invention is to provide a high-quality zirconia sol which exhibits lasting stability without inducing rise of viscosity or gelation and which, used as a coating agent or an inorganic binder, for example, exhibit thermal and chemical stability and a method for the production of the zirconia sol.

Still another object of this invention is to provide a high-quality zirconia sol which is useful as a coating agent capable of imparting to a substrate various properties such as resistance to heat and resistance to abrasion or as an inorganic binder capable of producing high adhesive strength and a method for the production of the zirconia sol.

A further object of this invention is to provide a slurry for the manufacture of a porous ceramic product possessed of lasting stability.

Yet another object of this invention is to provide a slurry suitable for the manufacture of a porous ceramic mold.

A further object of this invention is to provide a porous ceramic product excelling in mechanical strength.

A still further object of this invention is to provide a porous ceramic mold useful for precision casting of titanium or a titanium alloy.

DISCLOSURE OF THE INVENTION

The various objects described above are accomplished by a method for the production of a highly concentrated zirconia sol, which method comprises heating an aqueous solution of a zirconium salt in the presence of urea thereby forming a transparent zirconia sol, concentrating the zirconia sol with an ultrafilter membrane, and subsequently subjecting the resultant filtrate to thermal concentration at a temperature not exceeding 80° C.

These objects are accomplished also by a highly concentrated zirconia sol which is obtained by the method described above.

These objects are further accomplished by a porous ceramic-producing slurry which contains as essential components thereof a transparent zirconia sol obtained by heating an aqueous solution of a zirconium salt in the presence of urea and minute refractory particles.

These objects are accomplished further by a porous ceramic product obtained by firing a slurry containing as essential components thereof a transparent zirconia sol obtained by heating an aqueous solution of a zirconium salt in the presence of urea and minute refractory particles.

BEST MODE FOR CARRYING OUT THE INVENTION

In accordance with this invention, a highly concentrated zirconia sol is obtained by heating an aqueous solution of a zirconium salt in the presence of urea thereby forming a transparent zirconia sol, concentrating this transparent zirconia sol with an ultrafilter membrane, and thermally concentrating the resultant filtrate at a temperature not exceeding 80° C. This highly concentrated zirconia sol is transparent.

Now, the present invention will be described in detail below. First, a zirconia sol is produced by adding urea to an aqueous solution of a zirconium salt selected from among such water-soluble zirconium salts as zirconium oxychloride, zirconium nitrate, zirconium sulfate, and zirconium acetate and heating the resultant mixture. The reaction involved in this production is characterized by the fact that the concentration of ammonia produced by the hydrolysis of urea indicated by the following formula is highly uniform in the aqueous solution and, as the result, the particles of zirconia sol produced with ammonia and the zirconium salt have extremely small diameters.

$$(NH_2)_2CO + H_2O \rightarrow 2NH_3 + CO_2$$

The heating temperature to be used in this reaction is in the range of 60° to 300° C. The amount of urea per mol of the zirconium salt is in the range of 0.2 to 4 mols, preferably 0.5 to 2 mols. This reaction is stopped while the sol consequently produced is in a state retaining transparency. The sol is cooled and then concentrated by the use of an ultrafilter membrane. The ions present in the sol are expelled from the system in conjunction with water. When the sol resulting from the concentration contains ions in a high concentration, the removal of the ions is effected by diluting the sol with purified water and then repeating the step of concentration on the diluted sol or treating the sol with an ion-exchange resin. The sol resulting from the concentration is further concentrated by a heat treatment. This concentration is effected by keeping the temperature of the sol below 80° C., preferably in the range of 5° to 60° C., and more preferably in the range of 10° to 40° C.

The transparent zirconia sol obtained as described above is capable of acquiring a concentration of up to 50% by weight as $ZrO_2$ and exhibiting lasting stability.

This transparent zirconia sol has an acidic hydrogen-ion activity, specifically a pH in the range of 0.1 to 6, and a viscosity in the range of 5 to 3,000 cp, though variable with the concentration or the pH.

This transparent zirconia sol can be mixed at any desired ratio with water or a hydrophilic organic solvent. When it is to be used as a caking agent, therefore, the concentration of the zirconia sol can be adjusted, when necessary, by the use of water or a hydrophilic organic solvent.

A high-quality zirconia sol is obtained by preparing a transparent highly concentrated zirconia sol by the method described above and incorporating in this zirconia sol a chelating agent and a compound of a metal other than zirconium (hereinafter referred to as "other metal compound").

The chelating agents which are advantageously used herein include oxyphenols such as catechol and pyrogallol, amino alcohols such as diethanol amine and triethanol amine, oxyacids such as glycolic acid, lactic acid, and hydroxyacrylic acid and methyl, ethyl, hydroxyethyl, and other similar esters of such acids, oxyaldehydes such as glycol aldehyde, amino acids such as glycine and alanine, β-diketones such as acetyl acetone, benzoyl acetone, stearoyl acetone, stearoyl benzoyl methane, and dibenzoyl methane, and β-ketonic acids such as acetoacetic acid, propionyl acetic acid, and benzoyl acetic acid and methyl, ethyl, n-propyl, i-propyl, n-butyl, t-butyl, and other similar esters of such acids, for example. Among other chelating agents mentioned above, β-dicarbonyl compounds such as β-diketones, β-ketonic acids, and esters thereof prove to be particularly desirable.

The amount of the chelating agent to be added may be relatively small. The chelating agent added in an amount in the range of 0.02 to 1 mol, preferably 0.05 to 0.8 mol, per mol of zirconia in the sol manifests the expected effect fully satisfactorily. The addition of the chelating agent in an amount exceeding 1 mol per mol of the zirconia is not economical because the addition to the effect of the chelating agent is not increased proportionately. The other metal compounds which can be used in this invention include aluminum, yttrium, calcium, magnesium, titanium, tin, indium, cerium, and silicon, for example. These metallic element compounds may be used either singly or in the form of a combination of two or more members, depending on the purpose for which the sol is used. In these metallic element compounds, the compounds of yttrium, calcium, or magnesium are important with respect to the purpose of use of the sol of the present invention. Generally, such a metallic element compound is used in an amount in the range of 0.5 to 20 mol %, preferably 1 to 18 mol %, as an oxide based on the amount of zorconia.

The time and the method for the addition of the chelating agent and the metallic element compound are not specifically limited. They may be added at any desired time between the time the transparent zirconic sol has not yet been formed and the time it has been formed. The addition may be made, for example, (1) after the transparent zirconic sol is formed by heating the aqueous solution of a zirconium salt and urea, (2) after the transparent zirconic sol is concentrated with an ultrafilter membrane, or (3) after the transparent zirconic sol is concentrated with an ultrafilter membrane and then heated. Otherwise, the addition may be made (4) into the mixed solution of the aqueous solution of a zirconia salt and urea. No leakage of the chelating agent from the system is recognized even when the reaction for the formation of a sol is carried out after the addition of the chelating agent and the formed sol is concentrated with an ultrafilter membrane as in the case of (4). Since the reactant components can be uniformly mixed before the reaction for the formation of a sol, the zirconia type sol consequently produced enjoys high homogeneity and high quality. It is further possible to produce a sol consisting of particles having zirconia complexed with other reactant components. There are times (5) when the content of the chelating agent is required to be small by reason of the purpose of use of the produced sol. In this case, the chelating agent alone may be added in an amount commensurate with the time required for the purpose of stabilization and the metallic element compound may be added to and mixed with the sol immediately before the sol is put to use.

The high-quality zirconic sol of this invention, even in a highly concentrated state, retains stability generally for at least six months at room temperature.

The ceramic-producing slurry of this invention (hereinafter referred to simply as "slurry") contains as its essential components the aforementioned transparent or high-quality zirconic sol and minute refractory particles.

As the material for the minute refractory particles mentioned above, any of the refractory substances which are generally employed for the manufacture of ceramic products may be used. In consideration of the fact that these minute refractory particles are intended for manufacture of a mold for casting titanium or a titanium alloy, zirconia; zirconia completely or partly stabilized with CaO, $Y_2O_3$, or MgO; $WO_3$; $Y_2O_3$; $ThO_2$; MgO; and $CaCO_3$ which is transformed by calcination of into CaO are used advantageously because of their low reactivity with molten titanium. Among other materials mentioned above, the zirconia completely or partly stabilized with CaO (the term "calcia-stabilized zirconia" will be used in the present invention) proves to be particularly preferable. Especially, the electrically fused calcia-stabilized zirconia which has found extensive utility as a refractory material is preferable even from the economic point of view. This electrically fused calcia-stabilized zirconia contains CaO in a ratio in the range of 2 to 6% by weight. It is available in the form of ingots and, therefore, is pulverized into a powder before it is put to use.

When the slurry is prepared by using minute particles of the aforementioned electrically fused calcia-stabilized zirconia as minute refractory particles, the produced slurry may suffer the pH value thereof to vary with elapse of time and may quickly gain in viscosity possibly to the extent of undergoing gelation and ceasing to be useful as a slurry. A study on the cause for this lack of stability has revealed that part of the CaO incorporated as a stabilizer for zirconia fails to form a solid solution with zirconia and undergoes solution by the action of an acid such as nitric acid or hydrochloric acid and the CaO so dissolved out induces the slurry to gain in viscosity and undergo gelation.

This situation can be coped with by preparatorily effecting removal of the free CaO which has excaped the formation of a solid solution in the electrically fused calcia-stabilized zirconia by acidification of the free CaO with nitric acid or hydrochloric acid. To be specific, this removal of the free CaO is accomplished by treating the minute particles of electrically fused calcia-stabilized zirconia with such an acid as nitric acid, then thoroughly washing the acid-treated minute particles until the filtrate ceases to contain a nitric acid radical discernibly, drying the washed minute particles, and adding minute particles of calcia-stabilized zirconia now containing substantially no free CaO to the transparent zirconia sol. This procedure allows concurrent removal of such impurities as iron which mingle into the minute particles during the course of pulverization of ingots and permits preparation of a slurry with high repeatability.

Where the free CaO is contained in a relatively small amount, the stabilization of the slurry to withstand the influence of aging may be attained by suitable addition of an acid to give a fixed pH to the slurry or by preparatorily adding to the slurry in the process of preparation an acid in an amount commensurate with the amount of CaO to be dissolved out in the transparent zirconia sol.

This invention does not discriminate the aforementioned minute refractory particles on account of their diameters. The particle diameters may be suitably fixed in consideration of the kind and use of the shaped ceramic products aimed at and the stability of the slurry as well.

The ratio of the transparent zirconic sol to the minute refractory particles in the slurry of this invention is not particularly limited but may be suitably fixed in consideration of the stability of the slurry, for example. Generally, the amount of the minute refractory particles to be used is 1 to 5 times, preferably 2 to 4 times, the amount of the transparent zirconic sol.

The slurry of this invention can incorporate therein such additives as surfactant and dispersant which are generally used in slurries of this class.

When the slurry of this invention is used by a method of coating, for example, the adjustment of viscosity thereof and the stability to withstand the influence of aging claim due considerations. In this case, the optimum viscosity of the slurry can be easily realized by adjusting the water content of the slurry or by adjusting the pH value of the slurry to below 3, preferably to below 2, by the addition of an acid such as acetic acid, nitric acid, or hydrochloric acid. The slurry, in a state retaining this optimum viscosity, remains stable for a period of at least one month.

A porous ceramic mass is obtained by calcining the slurry of this invention at a high temperature. A shaped porous ceramic product of a desired pattern can be manufactured, therefore, by molding the slurry of this invention in that pattern and calcining the molded mass of the slurry. To be more specific, the slurry of this invention can be used effectively as a mold containing the transparent zirconic sol as a caking agent, i.e. a mold to be used for precision casting of a highly active metal such as titanium or a titanium alloy. The method to be employed for the manufacture of the mold from the porous ceramic material is not specifically limited. This mold may be manufactured by the following method, for example.

First, a slurry is prepared by adding to the transparent zirconic sol minute refractory particles of at least one substance selected from among zirconia, zirconia completely or partly stabilized with CaO, $Y_2O_3$, or MgO, $WO_3$, $Y_2O_3$, $ThO_2$, MgO, and $CaCO_3$ in an amount 1 to 5 times, preferably 1.5 to 3.5 times, the amount of the transparent zirconic sol and stirring them at a relatively low speed.

The diameters of the minute refractory particles are suitably fixed in consideration of the extent to which the wax forming the casting model is allowed to permeate while in a fused state in addition to the surface condition of the cast product desired to be manufactured. Generally, the minute refractory particles have an average particle size in the range of 200 to 400 mesh, preferably 300 to 380 mesh, are used in this invention.

Optionally, the slurry may suitably incorporate therein such additives as a surfactant serving to improve the wetting property the slurry manifests on the casting model, a dispersant serving to improve the dispersibility of the minute refractory particles, a defoaming agent serving to promote removal of foams from the slurry, and an organic binder serving to enhance the strength of the green mold which are generally used in the field of manufacture of ceramics. The incorporation of these additives must be carried out with full advertence because the additives would otherwise have the possibility of increasing the viscosity of the slurry or solidifying the slurry.

The slurry of this invention produces sufficient strength in the green mold as well as in the mold without requiring use of any organic binder and, therefore, enjoys a characteristic feature that in allows easy and simple manufacture of a mold of complicated shape.

Then, a green mold is produced by applying a coating of the slurry on a casting model formed separately of wax or other similar material or immersing the casting model in a bath of the slurry thereby forming a coating layer of the slurry on the casting model, sprinkling refractory particles on the coated casting model before the slurry layer is dried, repeating these steps at least three times thereby covering the casting model with a plurality of coating layers, and thereafter removing the casting model.

The refractory particles to be used for the formation of the aforementioned plurality of coating layers may be of the same kind as the minute refractory particles used for the preparation of the slurry or may be selected from among various kinds of refractory particles exhibiting low reactivity to the aforementioned fused titanium. Though the diameters of these refractory particles are not specifically limited, these refractory particles generally are coarser than the minute refractory particles used for the preparation of the slurry and have a particle size in the range of 20 to 200 mesh.

In the green mold which is obtained by the procedure described above, zirconia sol is used as a caking agent and zirconia as refractory particles. There are times when the green mold weighs and costs excessively. In this case, it is preferable that the first layer for direct contact with the fused metal during the course of casting and at least the second and third layers should be formed by the procedure employed for the formation of a coating layer as described above and the subsequent layers should be formed by a procedure employed for the manufacture of a mold containing silica gel as a caking agent and widely used for casting iron type cast products. This method requires to use silica colloidal sol or ethyl silicate as a caking agent and refractory particles made of zirconium sand, alumina, or fused silica. When this method is to be employed supplementarily for the fabrication of the green mold of the present invention, it is desirable to use a silica type sol and prepare a basic slurry. The use of the basic slurry is effective in improving the strength and waterproofness of the first two or three coating layers of this invention.

The aforementioned removal of the casting model can be easily effected by any ordinary dewaxing method where the casting model is made of wax. The dewaxing is preferable to be performed quickly in an autoclave using steam of about 150° C., with due advertence to preventing the plurality of coating layers from sustaining cracks due to expansion.

Finally, the produced green mold is subjected to a heat treatment for removal of the wax remaining thereon and subsequently calcined at a temperature in the range of 800° to 1,600° C., to give rise to a mold aimed at.

The slurry of this invention can be used for the manufacture of various shaped ceramic products such as crucibles and setters besides being used as a material for the mold mentioned above. Further, it can be used as a coating agent for impartation of heatproofness or as an impregnating agent.

Now, the present invention will be described more specifically below with reference to working examples.

EXAMPLE 1

In 200 liters of purified water, 30 kg of an aqueous zirconium nitrate solution containing 18% by weight of $ZrO_2$ and 3 kg of urea were dissolved. Then, the resultant aqueous solution was heated to 120° C. to produce a transparent zirconia sol. This sol was cooled and then concentrated with an ultrafiltration device to 10% by weight as $ZrO_2$. Subsequently, the concentrated sol was maintained in a vacuum at a temperature not exceeding 50° C. and thermally concentrated at a temperature of 35° C., to obtain a transparent zirconia sol having a concentration of 25% by weight and exhibiting lasting stability.

EXAMPLE 2

An aqueous solution obtained by adding 30 kg of an aqueous zirconium nitrate solution containing 18% by weight of $ZrO_2$ and 3 kg of urea to 180 liters of purified water was refluxed in a jacketed stirring column under normal pressure for about 8 hours, to obtain a transparent zirconia sol.

This transparent zirconia sol was cooled and treated in an ultrafiltration device to undergo concentration up to about 10% by weight as $ZrO_2$ and effect expulsion of water and unwanted ions from the system. Then, the sol was retained under a vacuum at a temperature below 40° C. in a concentration kettle provided with a stirrer and subjected to thermal concentration, to obtain a transparent zirconia sol containing 27% by weight of $ZrO_2$. The produced sol enjoyed lasting stability in spite of its high concentration.

To 1 kg of the transparent highly concentrated zirconia sol obtained as described above, 20 ml of acetyl acetone was added. Then, the resultant solution and yttrium hydroxide added thereto in an amount calculated for the resultant mixture to contain 3 mol % of yttria were thorough stirred, to obtain a transparent highly concentrated zirconia sol containing 3 mol % of yttria. The sol remained stable for at least 6 months.

EXAMPLE 3

One (1) kg of the transparent highly concentrated zirconia sol obtained in Example 2, 30 ml of acetyl acetone added thereto, and 26.1 g of diethoxy calcium subsequently added thereto were thoroughly stirred, to obtain a transparent highly concentrated zirconia type sol containing 4% by weight of calcia based on the amount of zirconia sol. This sol remained stably for not less than 6 months.

EXAMPLE 4

(1) Production of Transparent Zirconia Sol

To 200 liters of purified water, 30 kg of an aqueous zirconium nitrate solution containing 18% by weight of $ZrO_2$ and 3 kg of urea were added. Then, the resultant aqueous solution was heated to 100° C., to obtain a transparent zirconia sol. This sol was cooled and then concentrated with an ultrafiltration device to 10% by weight of $ZrO_2$. Further, the sol was retained under a vacuum at a temperature below 50° C. and subjected to thermal concentration, to obtain a transparent zirconia sol having a concentration of 25% by weight. This zirconia sol had a pH of 1.5 and a viscosity of 200 cp, and exhibited lasting stability.

(2) Preparation of Slurry

The zirconia sol obtained in (1) above was adjusted to pH 0.7 by addition of nitric acid. Consequently, the viscosity of this zirconia sol was adjusted to 50 cp. By adding 3 parts by weight of a fine calcia-stabilized zirconia powder passed through a 325-mesh screen, as kept in a stirred state, to one part by weight of the zirconia sol, to prepare a slurry. To this slurry, a surfactant (produced by Dai-ichi Kogyo Yakuhin Co., Ltd. and marketed under trademark designation of "Discoal AN706").

The slurry consequently obtained exhibited a viscosity of 75 seconds as measured with a Zahn Cup No. 4 and pH of 1.8. This slurry was stable for not less than 1 month.

(3) Production of Green Mold

Wax was applied thinly to a brass sheet measuring 50 mm in width, 170 mm in length, and 3 mm in thickness. On this sheet, three coating layers were formed by repeating a procedure of immersing the sheet in the slurry obtained in (2) above, spraying calcia-stabilized zirconia particles having a particle size of 60 to 120 mesh onto the slurry-covered sheet, and drying the coated sheet at room temperature. Subsequently, two coating layers were further superposed by repeating the procedure, excepting calcia-stabilized zirconia particles having a particle size of 24 to 70 mesh were used instead. Thus, a total of five coating layers were formed on the sheet.

Then, the wax coating was melted by heating one end of the brass sheet and the brass sheet was pulled away the coating layers. The wax remaining inside the consequently obtained green mold by washing with kerosene.

(4) Production of Mold

A mold was produced by calcining the green mold obtained in (3) above at a temperature indicated in Table 1.

(5) Determination of Strength of Mold

From the mold obtained in (4) above, test pieces were cut with a diamond cutter. The strength of test pieces was determined by the method for testing three-point bending strength.

Dimensions of test piece:
12 mm in width, 40 mm in length, and 6 mm in thickness.

Conditions of determination:

| Span | 30 mm |
|---|---|
| Temperature | Room temperature |
| Bending speed | 0.5 mm/min. |

The test was performed in a total of 10 runs. The averages of the magnitudes of strength consequently obtained are shown in Table 1.

TABLE 1

| Calcination temperature (°C.) | Bending strength (kg/cm$^2$) |
|---|---|
| 150 | 32 |
| 1100 | 35 |
| 1200 | 61 |
| 1300 | 85 |
| 1400 | 118 |
| 1500 | 129 |
| 1600 | 155 |

EXAMPLE 5

The transparent zirconia sol of a concentration of 25% by weight obtained in Example 4 was adjusted to pH 0.7 by addition of nitric acid. Consequently, the viscosity of this zirconia sol was adjusted to 50 cp. A slurry was prepared by adding 3 parts by weight of a fine powder of electrically fused calcia-stabilized zirconia passed through a 325-mesh screen (marketed by Daiichi Kigenso K. K.) as kept in a stirred state, to 1 part by weight of this zirconia sol. When this slurry was continuously stirred at room temperature for 1 hour, it underwent gelation and ceased to be useful as a slurry.

In an aqueous 10% nitric acid solution, the fine powder of electrically fused calcia-stabilized zirconia was stirred for acidification for 20 hours. After this acidification, the fine powder of zirconia was separated by filtration, washed with purified water until the filtrate ceased to contain any discernible nitric acid radical, and then dried. A slurry was prepared in the same manner as described above by using the consequently obtained acidified fine powder of electrically fused calcia-stabilized zirconia. This slurry retained stability for not less than 1 month without showing any inclination of increasing viscosity with elapse of time. The contents of calcia (CaO) in the fine powder of electrically fused calcia-stabilized zirconia before and after the acidification were determined by the fluorescent X-ray diffraction method. The results were as follows.

| Before acidification | 3.91% by weight |
|---|---|
| After acidification | 3.35% by weight |

From the results shown above, it is clearly noted that the acidification removed free CaO.

INDUSTRIAL APPLICABILITY

The high-quality zirconia sol of this invention is transparent, capable of raising the concentration thereof up to about 50% by weight as $ZrO_2$, excellent in stability even at such a high concentration, and incapable of either raising the viscosity thereof or inducing gelation or flocculation.

Even when the zirconia sol is used as a coating agent or a binder particularly at a high temperature, it avoids undergoing a variation in volume due to a change of phase of the zirconia and manifests various properties such as heat resistance and adhesive strength highly satisfactorily.

Further, the slurry of this invention retains stability for a long time without entailing rise of viscosity or gelation. A slurry enjoying lasting stability can be obtained by using as minute refractory particles a fine powder of acidified calcia-stabilized zirconia.

A mold befitting precision casting of a highly active metal such as, for example, titanium, zircoium, magnesium, or an alloy of such metal can be manufactured by using the slurry of this invention. Since this mold is capable of effectively preventing the otherwise possible reaction between the highly active metal mentioned above with the mold, it allows manufacture of a cast product of highly satisfactory skin. The use of the slurry of this invention permits manufacture of a mold capable of casting a large structure complicated in design. A shaped porous ceramic article excellent in mechanical strength can be obtained by molding the slurry of this invention in a desired shape and firing the molded mass of the slurry.

Further, the slurry of this invention can be used as a coating agent for impartation of heat resistance, for example.

We claim:

1. A method for the production of a zirconia sol, which method comprises heating an aqueous solution of a zirconium salt in the presence of urea thereby forming a transparent zirconia sol, concentrating said zirconia sol with an ultrafilter membrane, and then subjecting the concentrated zirconia sol to thermal concentration at a temperature in the range of 5° to 60° C.

2. A method according to claim 1, wherein the temperature for heating the aqueous zirconium salt solution is in the range of 60° to 300° C.

3. A method according to claim 1, wherein the amount of urea is in the range of 0.2 to 4 mols, based on 1 mol of said zirconium salt.

4. A method according to claim 1, wherein said zirconium salt is zirconium nitrate.

5. A method according to claim 1, wherein said transparent zirconia sol incorporates therein a chelating agent and a compound of a metal other than zirconium.

6. A method according to claim 5, wherein the amount of said chelating agent is in the range of 0.02 to 1 mol based on 1 mol of zirconia in said sol and the amount of other metal compound is in the range of 0.5 to 20 mol %, based on the amount of zirconia.

7. A method according to claim 5, wherein said chelating agent is at least one member selected from the group consisting of oxyphenols, amino alcohols, oxyacids and esters thereof, oxyaldehydes, amino acids, $\beta$-diketones, and $\beta$-ketonic acids and esters thereof.

8. A method according to claim 5, wherein said chelating agent is at least one member selected from the group consisting of $\beta$-diketones, $\beta$-ketonic acids, and esters thereof.

9. A method according to claim 5, wherein said compound of a metal other than zirconium is a compound of at least one metal selected from the group consisting of yttrium, calcium, and magnesium.

10. A method according to claim 5, wherein said zirconium salt is zirconium nitrate.

* * * * *